Nov. 23, 1954 J. H. KRAUSE 2,695,263
$CuCl_2$ SWEETENING OF CRACKED NAPHTHAS
Filed March 5, 1952
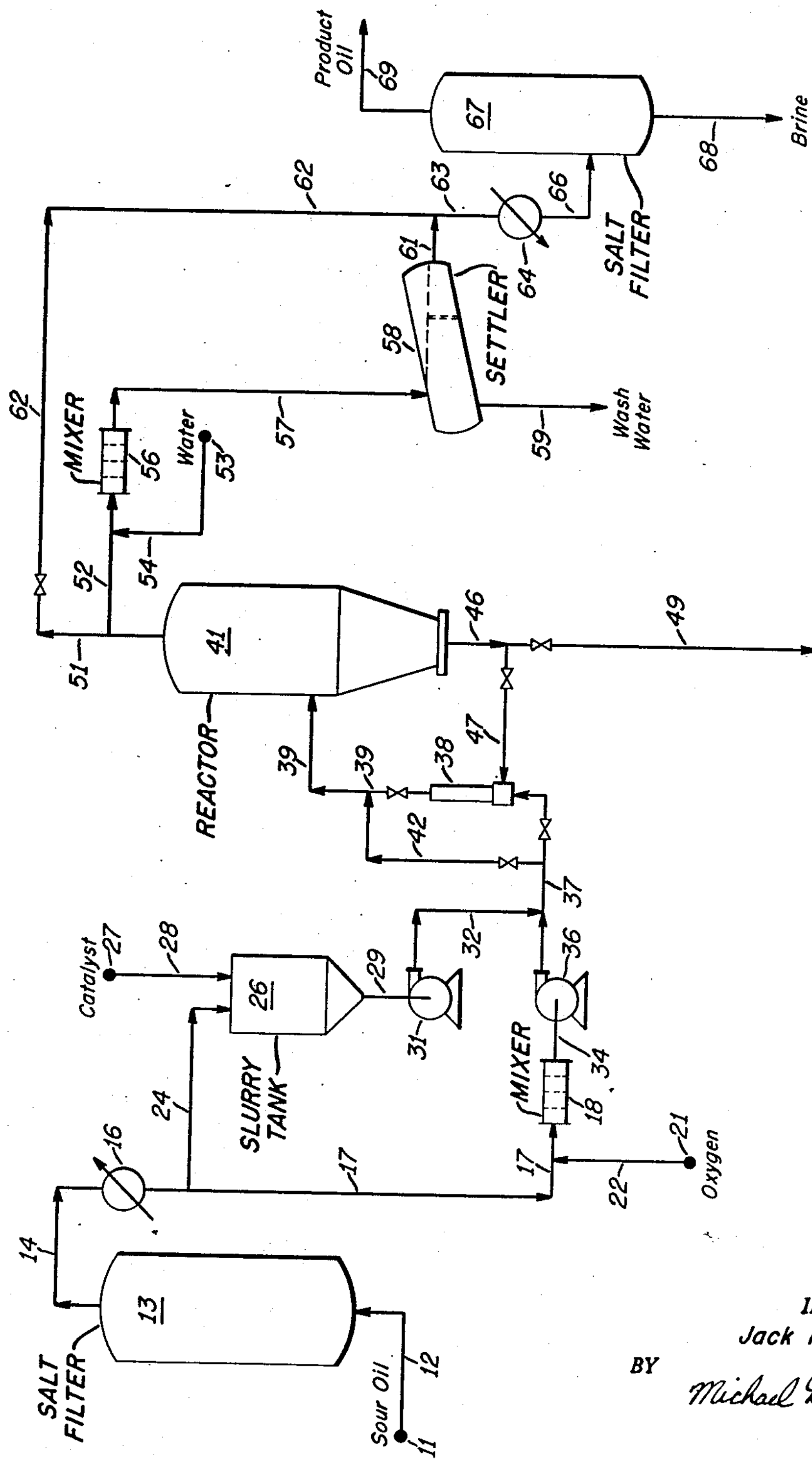
INVENTOR.
Jack H. Krause
BY Michael Dufinecz
ATTORNEY United States Patent Office 2,695,263

Patented Nov. 23, 1954

2,695,263

$CuCl_2$ SWEETENING OF CRACKED NAPHTHAS

Jack H. Krause, Hammond, Ind., assignor to Standard Oil Company, Chicago, Ill., a corporation of Indiana Application March 5, 1952, Serial No. 274,933

4 Claims. (Cl. 196—29)

This invention relates to the sweetening of cracked naphthas which contain objectionable amounts of mercaptans. More particularly, it relates to the sweetening of sour cracked naphthas by means of a supported cupric chloride catalyst.

The sweetening of naphthas which contain objectionable amounts of mercaptans, i. e., commonly known as sour naphthas by treatment with a supported $CuCl_2$ catalyst is of considerable commercial importance. Probably the best known copper sweetening process is the so-called Linde Slurry Process. In this process a catalyst comprising essentially $CuCl_2$, water and a carrier in the form of free flowing granules is dispersed into the sour naphtha and the dispersion is maintained until a substantially sweet naphtha has been obtained whereupon the sweet product naphtha is separated from the catalyst. Normally the contacting is carried out in the presence of free-oxygen in an amount sufficient to regenerate the catalyst. The carrier may be either an adsorbent material such as fuller's earth or acid treated clay or an essentially non-adsorbent material such as pumice or diatomaceous earth. It has been found that the essentially non-adsorbent materials rapidly become water-logged and lose their catalytic activity. For this reason the adsorbent materials, preferably finely divided fuller's earth, are commonly used in commercial operation.

The slurry process works very well and has a very long catalyst life when treating virgin sour naphthas. However, it has been found when treating cracked sour naphthas that excessive losses of catalyst occur. The catalyst is carried out of the contacting zone by the sweet naphtha and is lost to the process. This loss of catalyst has made the $CuCl_2$ treatment of cracked sour naphthas uneconomical.

It is an object of this invention to sweeten sour cracked naphthas using a supported $CuCl_2$ catalyst. Another object is the development of a $CuCl_2$-containing catalyst which will have a satisfactory life and a reasonable carryover loss when treating sour cracked naphthas.

These objects and other objects not specified have been attained by the use of granular catalyst comprising essentially $CuCl_2$, water and a carrier, wherein said carrier consists essentially of between about 60 and 80 weight percent of an essentially non-adsorbent material and between about 40 and 20 weight percent of an adsorbent material. The preferred essentially non-adsorbent materials are pumice and diatomaceous earth. The preferred adsorbent materials are fuller's earth and acid-treated clays.

The invention is described in relation to the figure. The figure shows one form of a process using the catalyst of this invention, which process is intended to be illustrative only. Numerous pumps, valves and other items of equipment have been omitted from the embodiment shown in the figure; these items may be readily added by those skilled in the art.

The feed stock to the process is a naphtha derived from the thermal or catalytic cracking of gas oils, reduced crudes and heavy naphthas. The feed may consist of a mixture of cracked naphtha and virgin naphtha wherein the cracked naphtha is the predominant component. The feed may be a cracked naphtha which has been subjected to prior treatment for reduction in mercaptan content or sulfur content, e. g., the effluent from the treatment of a sour cracked naphtha by one of the well known solutizer processes, which effluent is sour to the doctor test even though said effluent has a copper number of 1 or 2. The sour oil should be $H_2S$-free. If the feed contains $H_2S$, the $H_2S$ should be removed by washing with a dilute aqueous caustic solution or other method of removing $H_2S$ that does not also remove all the mercaptans. Caustic solution reacts with the copper catalyst and deactivates it. Therefore, it is necessary to remove any caustic which may be present in the feed. The sour oil feed in this illustration, a naphtha derived from the fluid catalytic cracking of a virgin gas oil and having a Cu No. of about 12, is passed from source 11 through line 12, into salt filter 13. Salt filter 13 consists of a cylindrical vessel filled with crushed rock salt. The rock salt removes any aqueous caustic that may be occluded in the feed. Instead of using a salt drum, a vessel filled with steel wool, gravel, sand or other coalescing medium may be used.

The naphtha is passed out of salt filter 13, through line 14, into heat exchanger 16. In heat exchanger 16 the temperature of the sour cracked oil is raised to about 80° F. In general, the temperature of operation should be between about 60° and 100° F. From heat exchanger 16 the oil is passed by way of line 17 into mixer 18. Mixer 18 may be any form of agitating device. In this case mixer 18 is provided with knothole orifice plates. Free-oxygen from source 21 is passed through line 22 into line 17 where it meets the main stream of sour cracked naphtha. The free-oxygen and the sour cracked naphtha are thoroughly intermingled in mixer 18.

Theoretically, the amount of free-oxygen needed in the process to insure substantially complete regeneration of the catalyst is 1 mol for each 4 mols of mercaptan present. However, normally a 100 or 200% excess is desirable. In general, from about 0.1 to 2 standard cubic feet of free-oxygen or an equivalent amount of air are used in the process.

A side stream of the sour cracked naphtha is withdrawn from line 17 by way of line 24 and is passed into slurry tank 26. Slurry tank 26 is a cone-bottomed vessel provided with an agitator not shown. Fresh catalyst from source 27 is added by way of line 28 to slurry tank 26. The slurry of catalyst and sour cracked naphtha is passed from tank 26 through line 29 by way of pump 31 into line 32. The main stream of sour cracked naphtha is passed from mixer 18 by way of line 34 and pump 36 into line 37 where it meets the makeup catalyst slurry from line 32.

The catalyst comprises $CuCl_2$, water and a carrier. The carrier consists essentially of a finely powdered mixture, having a screen size of less than about 80 mesh, of 75 weight percent of pumice and 25 weight percent of fuller's earth. Adsorbed on the carrier is an aqueous solution of $CuCl_2$. Based on the total catalyst, the catalyst should contain between about 5 and 30 weight percent of water and between about 1 and 25 weight percent of $CuCl_2$. The $CuCl_2$ may be added by using either the anhydrous salt or the hydrated salt. However, the $CuCl_2$ may be made by reacting in aqueous solution cupric sulfate and sodium chloride or ammonium chloride. When forming the $CuCl_2$ by this reaction, it is preferred to use a small excess of the chloride salt.

The sour cracked naphtha-oxygen-catalyst dispersion in line 37 is passed into eductor 38 and from eductor 38 it is passed through line 39 into reactor 41. In some cases the eductor may be by-passed and the dispersion passed into line 39 by way of by-pass line 42. In reactor 41 the sour cracked naphtha and the catalyst are maintained in the dispersed condition until the sour naphtha is substantially sweet.

Reactor 41 has a conical shaped lower portion into which the catalyst settles. The dense slurry of catalyst and naphtha is withdrawn from the bottom of reactor 41 through line 46 and is passed into eductor 38 by way of line 47. In eductor 38 the recycle catalyst meets the stream of sour naphtha and makeup catalyst. When the catalyst has become substantially inactive, catalyst is sent to recovery by way of lines 46 and 49.

The sweet naphtha contains a very slight amount of catalyst. The copper in the catalyst has an adverse effect on the color stability of the naphtha. The catalyst containing sweet naphtha is withdrawn from reactor 41 through line 51 and is passed into line 52 where it meets water from source 53 in line 54. The amount of wash water used is dependent upon the amount of catalyst carried over from the reactor. In general, the amount of wash water may be between about 10 and 100 volume percent based on sweet naphtha. The mixed stream of water and sweet naphtha is passed into mixer 56. From mixer 56 the stream of sweet naphtha and water is passed by way of line 57 into settler 58. The wash water separates in settler 58 and is sent to a sewer by way of line 59. The washed sweet naphtha from settler 58 is passed into line 61. In some cases the washing operation is not necessary and the operation may be by-passed by way of lines 51 and 62. The washed naphtha from line 61 is passed through line 63, through cooler 64 and line 66 into salt filter 67. Cooler 64 lowers the temperature of the washed naphtha in order to reduce the amount of water dissolved in the naphtha, and salt filter 67 dehydrates the washed naphtha. Brine from vessel 67 is passed to the sewer by way of line 68. Salt filter 67 is similar in construction to salt filter 13. Sweet product oil is passed to storage not shown by way of line 69.

It is to be understood that the above described embodiment is illustrative only and is not intended to limit the scope of this invention. Many variations thereon can be readily made by those skilled in the art.

The catalyst of this invention can be used in the so-called solid process for copper sweetening of naptha. In the solid process a granular catalyst usually 16 to about 100 mesh in the form of a fixed bed is used. The sour naphtha flows up through the fixed bed. When using appreciable amounts of material of mesh sizes approaching 80 or higher and sweetening sour cracked naphthas, a considerable carryover loss of catalyst occurs in this fixed bed operation. The catalyst of this invention is effective in substantially reducing and even eliminating this loss. Thus the catalyst of this invention can be used either in a fixed bed operation or a slurry operation.

In order to illustrate the results obtainable with this invention, tests were made on a mixture of a thermally cracked and a catalytically cracked sour naphtha when using various carriers. These tests were carried out in a laboratory size continuous pilot plant which closely simulates the operation of a large scale commercial unit. In each run 6 liters of sour cracked naphtha were passed through the apparatus. The catalyst consisted of 18 g. of $CuCl_2$, water and carrier. In each case the catalyst composition was on a weight percent basis, $CuCl_2$, 18%; water, 7%; and carrier, 75%. The carriers used were finely powdered pumice and finely powdered Attapulgus clay. In each run the amount of catalyst carryover in precent on catalyst charged was determined by filtering the sweet naphtha. The results of these tests are shown below:

*Table*

| Run | Catalyst—Wt. Percent | | Carryover |
|---|---|---|---|
| | Pumice | Clay | |
| 1 | 0 | 100 | 2.8 |
| 2 | 10 | 90 | 1.3 |
| 3 | 50 | 50 | 1.6 |
| 4 | 60 | 40 | 0.4 |
| 5 | 70 | 30 | 0.2 |
| 6 | 80 | 20 | 0 |
| 7 | 90 | 10 | (1) |
| 8 | 100 | 0 | (1) |

[1] Process inoperative because catalyst would not flow—waterlogged.

These tests show that the catalyst carryover when using Attapulgus clay alone is a prohibitive 2.8%. Furthermore, they show that while the carryover decreases when a mixture of pumice and Attapulgus clay are used, the carryover is still excessive at an equal weight mixture. The carryover in Run 4 shows a phenomenal decrease in carryover when the amount of pumice is increased from 50% to 60%. The carryover in Run 4 is only 25% of that shown in Run 3. While the catalyst carryover dropped to 0 at 80% of pumice in the carrier, these tests show that at pumice contents in excess of about 80%, the catalyst life is very short because the catalyst becomes waterlogged.

Having described the invention, what is claimed is:

1. In the method of refining a cracked naphtha which contains an objectionable amount of mercaptans by dispersing in said naphtha an effective amount of a granular catalyst comprising cupric chloride, water and a carrier, in the presence of free-oxygen, maintaining said dispersion for a time sufficient to sweeten said naphtha and separating said sweet naphtha from said catalyst, the improvement wherein said carrier consists essentially of from about 60 to 80 weight percent of an essentially non-adsorbent material and from about 40 to 20 weight percent of an adsorbent material.

2. The improvement in the method of claim 1 wherein said non-adsorbent material is pumice and said adsorbent material is fuller's earth.

3. A process for sweetening a sour cracked naphtha, which process comprises dispersing in said naphtha an effective amount of a granular catalyst comprising between about 1 and 25 weight percent of cupric chloride, between about 5 and 30 weight percent of water and the remainder a carrier consisting essentially of from about 60 to 80 weight percent of an essentially non-adsorbent material and from about 40 to 20 weight percent of an adsorbent material, in the presence of an effective amount of free-oxygen, maintaining said dispersion for a time sufficient to render said naphtha substantially sweet, and separating said sweet naphtha from said catalyst.

4. The process of claim 3 wherein said carrier consists essentially of between about 60 and 80 weight percent of pumice and between about 40 and 20 weight percent of fuller's earth.

References Cited in the file of this patent

UNITED STATES PATENTS

| Number | Name | Date |
|---|---|---|
| 2,042,052 | Hoover | May 26, 1936 |
| 2,270,248 | Benedict | Jan. 20, 1942 |
| 2,284,273 | Franklin | May 26, 1942 |